US010890203B2

(12) United States Patent
Wojciechowski et al.

(10) Patent No.: US 10,890,203 B2
(45) Date of Patent: Jan. 12, 2021

(54) APPARATUS FOR SECURING A TOOL IN AN OPENING AND METHOD OF USING SAME

(71) Applicant: GENERAL ELECTRIC COMPANY, Schenectady, NY (US)

(72) Inventors: Piotr Hubert Wojciechowski, Warsaw (PL); Szymon Perkowski, Warsaw (PL)

(73) Assignee: General Electric Company, Schenectady, NY (US)

( * ) Notice: Subject to any disclaimer, the term of this patent is extended or adjusted under 35 U.S.C. 154(b) by 116 days.

(21) Appl. No.: 16/099,976

(22) PCT Filed: May 19, 2016

(86) PCT No.: PCT/PL2016/000056
§ 371 (c)(1),
(2) Date: Nov. 8, 2018

(87) PCT Pub. No.: WO2017/200400
PCT Pub. Date: Nov. 23, 2017

(65) Prior Publication Data
US 2019/0128301 A1 May 2, 2019

(51) Int. Cl.
*F16B 13/06* (2006.01)
*F16B 2/18* (2006.01)
(Continued)

(52) U.S. Cl.
CPC ............ *F16B 13/065* (2013.01); *F16B 2/185* (2013.01); *F16B 13/0858* (2013.01); *F16B 19/109* (2013.01)

(58) Field of Classification Search
CPC ......... Y10T 29/53848; Y10T 29/53883; Y10T 29/53896; Y10T 29/53796;
(Continued)

(56) References Cited

U.S. PATENT DOCUMENTS 1,458,076 A * 6/1923 Potts ...................... B25B 27/18
81/441
2,133,697 A * 10/1938 Hansen .................. B25B 27/24
29/214
(Continued)

FOREIGN PATENT DOCUMENTS

DE 664003 C 8/1936
EP 0548622 A1 6/1993
(Continued)

OTHER PUBLICATIONS

International Search Report and Written Opinion dated Feb. 14, 2017 which was issued in connection with PCT application No. PCT/PL2016/000056 which was filed on May 19, 2016.

*Primary Examiner* — Tyrone V Hall, Jr.
(74) *Attorney, Agent, or Firm* — Armstrong Teasdale LLP

(57) ABSTRACT

A locking device (100) is operable to lock a tool (150) in an opening. The locking device includes a base (104) positionable with respect to a lifting member (152) of the tool when a first end of the lifting member is positioned within the opening. The locking device also includes a lift (106) coupled to the base for movement relative to the base. The lift includes an interface portion (110) coupleable to the lifting member such that the lifting member is moveable with the interface portion in an extraction direction of the opening when the lift is moved from a first position to a second position relative to the base.

20 Claims, 8 Drawing Sheets

(51) Int. Cl.
  *F16B 13/08* (2006.01)
  *F16B 19/10* (2006.01)
(58) Field of Classification Search
  CPC ........... Y10T 29/53683; F16B 19/1063; F16B 19/109; F16B 21/00; F16B 21/04; F16B 13/0858; F16B 13/124; B25B 27/02; B25B 27/023; B25B 27/14; B25B 27/16
  See application file for complete search history.

(56) References Cited

U.S. PATENT DOCUMENTS

| | | | | |
|---|---|---|---|---|
| 2,224,031 A * | 12/1940 | Kalbeck | ................. | B25B 27/02 |
| | | | | 29/267 |
| 3,042,094 A * | 7/1962 | Liljeberg | ................ | F16B 35/04 |
| | | | | 411/271 |
| 3,074,719 A * | 1/1963 | McKee | ............. | A63B 57/0037 |
| | | | | 473/386 |
| 3,200,484 A * | 8/1965 | Garman | ................ | B25B 27/023 |
| | | | | 29/263 |
| 3,222,054 A | 12/1965 | Bisulca et al. | | |
| 3,305,921 A * | 2/1967 | Morse | .................. | B25B 27/205 |
| | | | | 29/229 |
| 3,611,539 A * | 10/1971 | Meaden, Jr. | ........... | B21D 28/34 |
| | | | | 29/265 |
| 3,727,491 A * | 4/1973 | Buckwalter | ........... | B25B 23/103 |
| | | | | 81/53.2 |
| 3,769,682 A * | 11/1973 | Carver | .................. | B25B 27/02 |
| | | | | 29/255 |
| 3,961,410 A * | 6/1976 | Reed | .................... | B25B 27/023 |
| | | | | 29/256 |
| 4,620,695 A | 11/1986 | Vanistendael | | |
| 4,875,266 A * | 10/1989 | Batten | ................... | B25B 27/023 |
| | | | | 29/263 |
| 4,980,959 A * | 1/1991 | Czarnowski | ............. | B25B 23/00 |
| | | | | 29/240.5 |
| 5,158,331 A | 10/1992 | Wesselski | | |
| 5,362,185 A * | 11/1994 | Haack | ................... | B25B 27/023 |
| | | | | 411/324 |
| 5,513,547 A * | 5/1996 | Lovelace | ............... | B23Q 3/186 |
| | | | | 29/271 |
| 5,961,024 A * | 10/1999 | Wright, Jr. | .............. | B25B 27/04 |
| | | | | 173/20 |
| 6,601,277 B1 * | 8/2003 | Swanson | ............... | B25B 27/023 |
| | | | | 29/256 |
| 6,910,252 B2 * | 6/2005 | Draggie | .................. | B21J 15/50 |
| | | | | 254/18 |
| 7,946,013 B2 * | 5/2011 | Kumagai | ................ | B25B 27/00 |
| | | | | 29/255 |
| 8,341,817 B2 * | 1/2013 | Chung | .................. | B62K 25/02 |
| | | | | 269/229 |
| 8,763,221 B1 * | 7/2014 | Boss | ..................... | B25B 27/023 |
| | | | | 29/235 |

FOREIGN PATENT DOCUMENTS

| | | | | |
|---|---|---|---|---|
| FR | 2710702 A1 | 4/1995 | | |
| GB | 370332 A | 7/1945 | | |
| GB | 570332 A | * 7/1945 | .............. | F16B 21/00 |

* cited by examiner

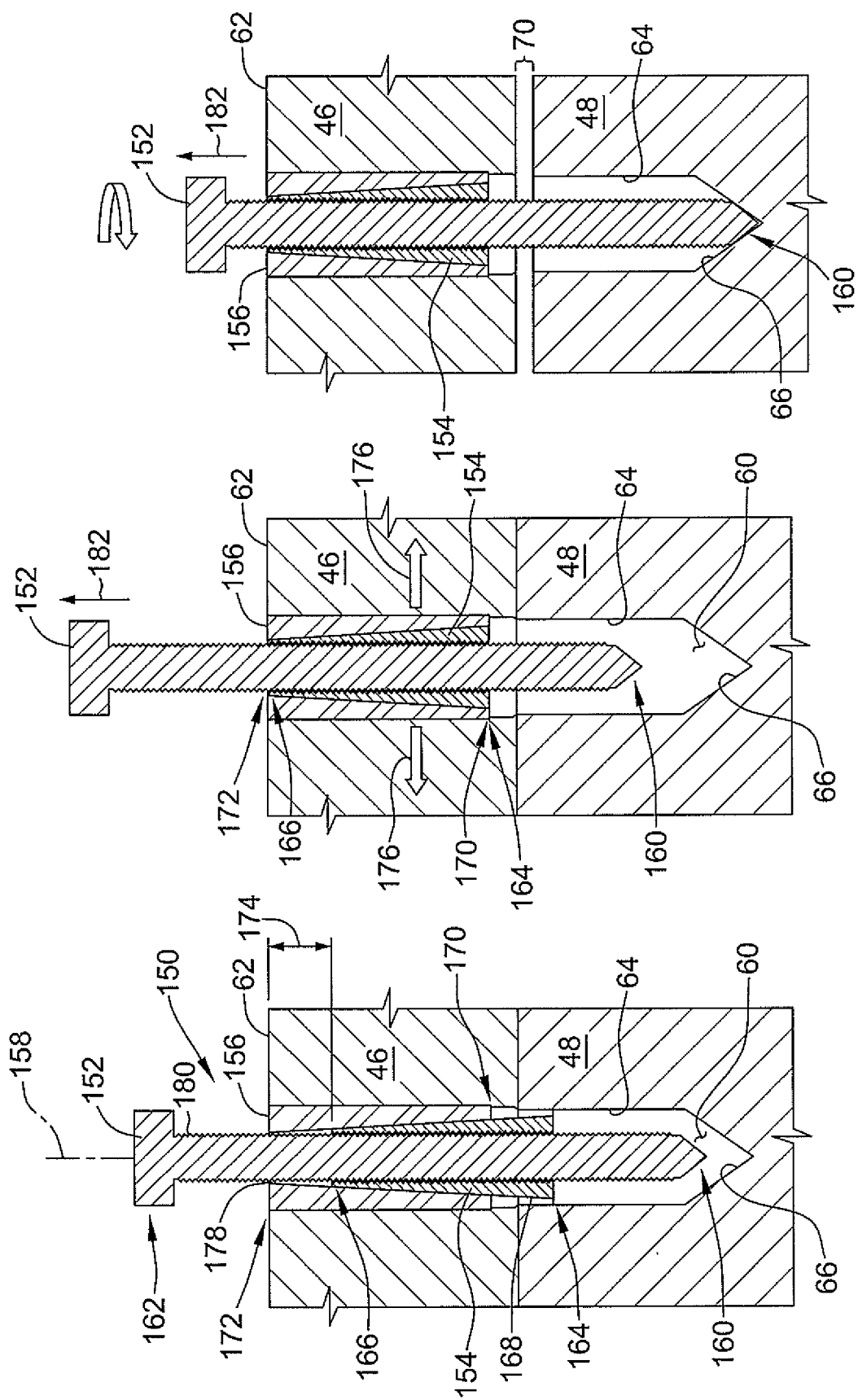

APPARATUS FOR SECURING A TOOL IN AN OPENING AND METHOD OF USING SAME

BACKGROUND

The field of the disclosure relates generally to a device for securing a tool in an opening, and more particularly to a device for securely engaging a tool against a wall that defines a fastener opening.

At least some known mechanical applications require insertion of a tool into an opening, such as but not limited to a fastener opening, and further require secure engagement of the tool against a wall that defines the opening. However, in at least some such mechanical applications, it is difficult to apply a locking force to secure the tool in the opening due, for example, to space limitations near the opening.

BRIEF DESCRIPTION

In one aspect, a locking device operable to lock a tool in an opening is provided. The locking device includes a base positionable with respect to a lifting member of the tool when a first end of the lifting member is positioned within the opening. The locking device also includes a lift coupled to the base for movement relative to the base. The lift includes an interface portion coupleable to the lifting member such that the lifting member is moveable with the interface portion in an extraction direction of the opening when the lift is moved from a first position to a second position relative to the base.

In another aspect, a system for separating two sections of a turbine casing that define a fastener opening extending therebetween is provided. The system includes a lifting member that includes a first end positionable within the fastener opening, and a base positioned with respect to the lifting member when the first end is positioned within the fastener opening. The system also includes a lift coupled to the base for movement relative to the base. The lift includes an interface portion coupled to the lifting member such that the lifting member is moveable with the interface portion in an extraction direction of the opening when the lift is moved from a first position to a second position relative to the base.

In another aspect, a method of locking a tool in an opening is provided. The method includes positioning a first end of a lifting member of the tool within the opening, and positioning a base of a locking device with respect to the lifting member. A lift is coupled to the base for movement relative to the base. The method also includes coupling an interface portion of the lift to the lifting member, and moving the lift from a first position to a second position relative to the base, such that the interface portion moves the lifting member in an extraction direction of the opening.

DRAWINGS

FIG. 3 is a schematic cross-sectional view, taken along lines 3-3 shown in FIG. 2, of an exemplary tool coupled to the casing shown in FIG. 2;

FIG. 4 is another schematic cross-sectional view, taken along lines 3-3 shown in FIG. 2, of the tool shown in FIG. 3 coupled to the casing shown in FIG. 2;

FIG. 5 is another schematic cross-sectional view, taken along lines 3-3 shown in FIG. 2, of the tool shown in FIG. 3 coupled to the casing shown in FIG. 2;

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Approximating language may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise.

Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The exemplary components and methods described herein overcome at least some of the disadvantages associated with known systems and methods for securely engaging a tool within an opening. The embodiments described herein include a locking device that is positionable with respect to a lifting member of the tool. The locking device includes a lift coupled to a base for movement relative to the base. An interface portion of the lift couples to the lifting member to move the lifting member in an extraction direction of the opening when the lift is moved from a first position to a second position relative to the base. For example, the lift is coupled to a rotatable handle that enables rapid application of an impulse to the lifting member, and the lifting member forces a first tapered bushing of the tool into a complementarily tapered second bushing of the tool, such that the second bushing expands into a tight interference fit within the opening.

Figure 1:
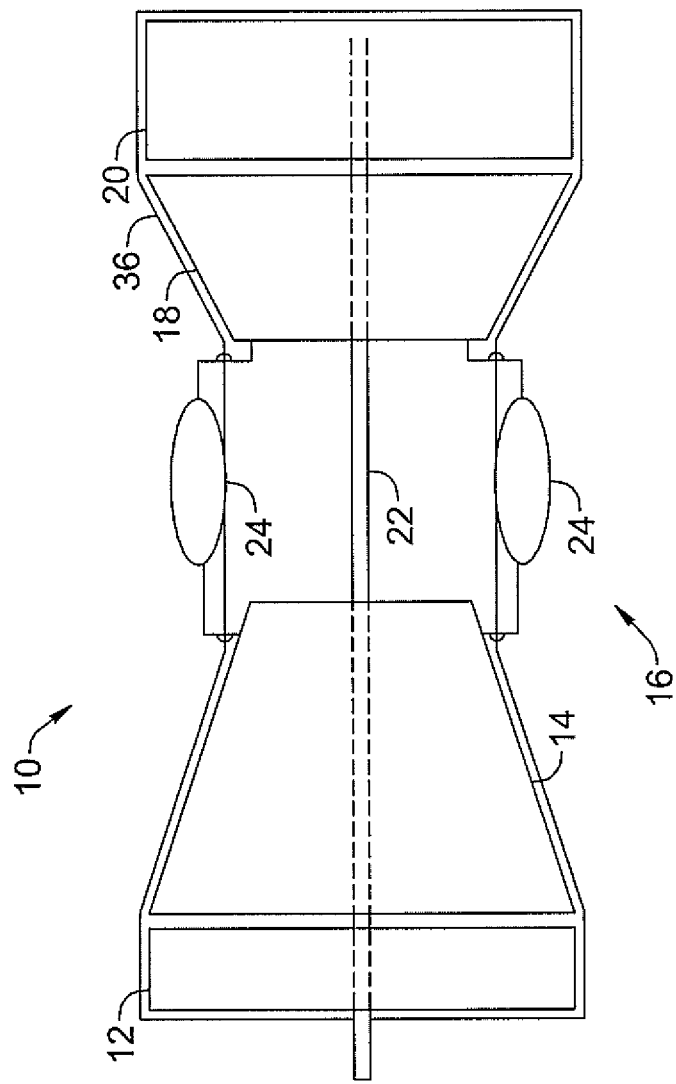
FIG. 1 is a schematic view of an exemplary rotary machine.

FIG. 1 is a schematic view of an exemplary rotary machine 10 with which embodiments of the current disclosure may be used. While FIG. 1 describes an exemplary gas turbine engine, it should be noted that the horizontal joints described herein are not limited to any one particular type of rotary machine. It should be understood that the current methods, apparatus, and systems described herein may be used with any rotary machine, including a steam turbine, in any suitable configuration that enables such methods and systems to operate as further described herein. Moreover, while embodiments of the current disclosure are described in terms of use with rotary machine 10, it should be understood that the current methods, apparatus, and systems described herein are not limited to use with rotary machines, but rather may be used in any application for which securing a bushing against a wall that defines a fastener opening is suitable.

In the exemplary embodiment, gas turbine 10 includes an intake section 12, a compressor section 14 coupled downstream from intake section 12, a combustor section 16 coupled downstream from compressor section 14, a turbine section 18 coupled downstream from combustor section 16, and an exhaust section 20 coupled downstream from turbine section 18. A casing 36 at least partially encloses one or more of intake section 12, compressor section 14, combustor section 16, turbine section 18, and exhaust section 20. In some embodiments, casing 36 includes a plurality of casings that at least partially enclose different sections of gas turbine 10.

Turbine section 18 is coupled to compressor section 14 via a rotor shaft 22. It should be noted that, as used herein, the term "couple" is not limited to a direct mechanical, electrical, and/or communication connection between components, but may also include an indirect mechanical, electrical, and/or communication connection between multiple components.

During operation of gas turbine 10, intake section 12 channels air towards compressor section 14. Compressor section 14 compresses the air to a higher pressure and temperature and discharges the compressed air towards combustor section 16. In combustor section 16, the compressed air is mixed with fuel and ignited to generate combustion gases that are channeled towards turbine section 18. More specifically, combustor section 16 includes at least one combustor 24, in which a fuel, for example, natural gas and/or fuel oil, is injected into the air flow, and the fuel-air mixture is ignited to generate high temperature combustion gases that are channeled towards turbine section 18.

Turbine section 18 converts the thermal energy from the combustion gas stream to mechanical rotational energy, as the combustion gases impart rotational energy to at least one rotor blade 38 coupled to rotor shaft 22 within turbine section 18. Rotor shaft 22 may be coupled to a load (not shown) such as, but not limited to, an electrical generator and/or a mechanical drive application. The exhausted combustion gases flow downstream from turbine section 18 into exhaust section 20.

Figure 2:
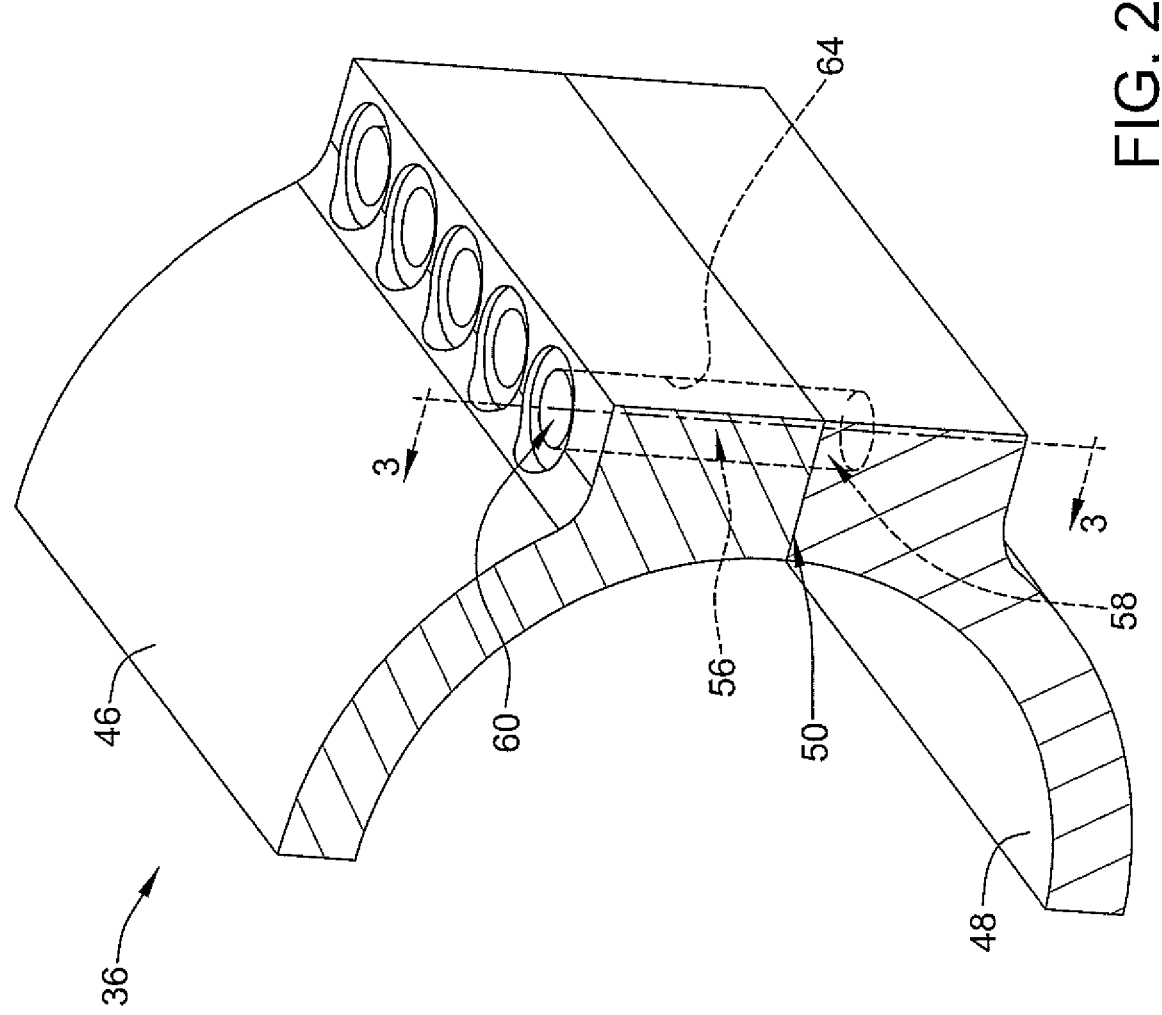
FIG. 2 is a simplified perspective view of a section of an exemplary casing that may be used with the exemplary rotary machine shown in FIG. 1.

FIG. 2 is a simplified perspective view of a section of an embodiment of casing 36. In the exemplary embodiment shown in FIG. 2, upper section 46 and lower section 48 meet to form a horizontal joint 50. It should be understood that another horizontal joint 50 is formed on an opposite side of casing 36 (not shown). A plurality of upper bolt holes 56 extend through upper section 46, and a plurality of lower bolt holes 58 extend through lower section 48. Each upper bolt hole 56 is configured to align with a corresponding lower bolt hole 58 when upper section 46 is positioned for coupling to lower section 48. Each aligned upper bolt hole 56 and lower bolt hole 58 defines a corresponding fastener opening 60 extending between upper section 46 and lower section 48. An interior wall 64 within upper casing 46 and lower casing 48 at least partially defines fastener opening 60. Although embodiments of the disclosure are described with reference to fastener opening 60, it should be understood that the scope of the disclosure is not limited to use with fastener opening 60, but rather extends to use with any suitable opening.

FIGS. 3, 4, and 5 are schematic cross-sectional views, taken along lines 3-3 shown in FIG. 2, of an exemplary tool 150 coupled to casing 36. In the exemplary embodiment, tool 150 includes a lifting member 152, an inner lifting bushing 154, and an outer lifting bushing 156. Lifting member 152 extends from a first end 160 to an opposite second end 162, and defines a longitudinal axis 158. First end 160 of lifting member 152 is insertable into fastener opening 60 in a clearance fit. In the exemplary embodiment, lifting member 152 is a threaded bolt. In alternative embodiments, lifting member 152 is any suitable structure that enables tool 150 to function as described herein.

Inner lifting bushing 154 extends circumferentially around an exterior surface of lifting member 152, and extends longitudinally along lifting member 152 from a first end 164 to a second end 166. More specifically, first end 164 is positioned relatively closer to first end 160 of lifting member 152, and second end 166 is positioned relatively closer to second end 162 of lifting member 152. In the exemplary embodiment, inner lifting bushing 154 defines an exterior surface 168 that tapers longitudinally from a greater width proximate first end 164 to a lesser width proximate second end 166. In alternative embodiments, inner lifting bushing 154 defines any suitable shape that enables tool 150 to function as described herein.

Inner lifting bushing 154 is coupled for longitudinal movement with lifting member 152. For example, in the illustrated embodiment, an exterior surface 180 of lifting member 152 is threaded, and inner lifting bushing 154 is threadably coupled to exterior surface 180. In alternative embodiments, inner lifting bushing 154 is coupled for movement with lifting member 152 in any suitable fashion. Timer lifting bushing 154 is sized for insertion along with first end 160 of lifting member 152 into fastener opening 60 in a clearance fit.

Outer lifting bushing 156 extends circumferentially to define a generally annular shape, and extends longitudinally from a first end 170 to a second end 172. In the exemplary embodiment, outer lifting bushing 156 defines an interior surface 178 that tapers longitudinally from a greater width proximate second end 172 to a lesser width proximate first end 170. More specifically, interior surface 178 of outer lifting bushing 156 is tapered complementarily to exterior surface 168 of inner lifting bushing 154, such that inner lifting bushing 154 is at least partially receivable within outer lifting bushing 156 when inner lifting bushing 154 and outer lifting bushing 156 are longitudinally aligned. Outer lifting bushing 156 also defines an exterior surface sized such that outer lifting bushing 156 is slidable into, and positionable within, fastener opening 60 in a clearance fit, and expandable into an interference fit within fastener opening 60. In alternative embodiments, outer lifting bushing 156 defines any suitable shape that enables tool 150 to function as described herein.

In the exemplary embodiment, tool 150 is operable to facilitate separation of upper casing 46 and lower casing 48. In operation, first end 160 of lifting member 152 is inserted through second end 172 of outer lifting bushing 156, and further through first end 170 of outer lifting bushing 156, in a clearance fit. Inner lifting bushing 154 is then coupled to lifting member 152 such that at least second end 166 of inner lift bushing 154 is received within outer lifting bushing 156. For example, but not by way of limitation, second end 166, and further first end 164, of inner lifting bushing 154 are threaded onto lifting member 152, such that a portion of tapered interior surface 178 of outer lifting bushing 156 rests against tapered exterior surface 168 of inner lifting bushing 154. First end 160 of lifting member 152, having inner lifting bushing 154 and outer lifting bushing 156 coupled thereto, is then inserted into fastener opening 60 such that second end 172 of outer lifting bushing 156 is flush with a surface 62 in which fastener opening 60 is defined, and second end 166 of inner lifting bushing 154 is positioned within fastener opening 60 at a first depth 174, as shown in FIG. 3.

Further in operation, to securely engage outer lifting bushing 156 against interior wall 64 that defines fastener opening 60, and thus lock tool 150 within fastener opening 60, lifting member 152 is moved in an extraction direction 182 of fastener opening 60, that is, in the longitudinal direction opposite the direction of insertion, as shown in FIG. 4. Inner lifting bushing 154, coupled for movement with lifting member 152, also is moved in extraction direction 182. Tapered exterior surface 168 couples against complementarily tapered interior surface 178 of outer lifting bushing 156 and transfers the longitudinal movement of lifting bolt 152 into a transversely outward movement of the exterior surface of outer lifting bushing 156, as represented by arrows 176, causing outer lifting bushing 156 to engage interior wall 64 in an interference fit such that tool 150 is locked within fastener opening 60. In certain embodiments, lifting member 152 is moved sharply, that is, at a high rate of speed, in extraction direction 182, to facilitate increased engagement of tapered surfaces 168 and 178 and, thus, increased transverse expansion of outer lifting bushing 156. Alternatively, lifting member 152 is moved in extraction direction 182 in any suitable fashion that enables tool 150 to function as described herein.

Further in operation, to separate upper section 46 from lower section 48 (shown in FIG. 2), lifting member 152 is moved in extraction direction 182 relative to inner lifting bushing 154 and fastener opening 60. Inner lifting bushing 154 coupled for longitudinal movement with lifting member 152 also moves in extraction direction 182, and tapered surface 168 of inner lifting bushing 154 urges tapered surface 178 of outer lifting bushing 156 in extraction direction 182. Outer lifting bushing 156, via the interference fit between outer lifting bushing 156 and interior wall 64, moves upper section 46 in extraction direction 182 relative to lower section 48, such that a gap 70 is created between upper section 46 and lower section 48.

For example, in the exemplary embodiment, lifting member 152 is rotated relative to inner lifting bushing 154 while tension is maintained on lifting bolt 152 in the extraction direction. The threaded connection between lifting bolt 152 and inner lifting bushing 154, as described above, advances first end 160 of lifting bolt 152 in the insertion direction, such that first end 160 engages an end wall 66 of fastener opening 60. Moreover, in the exemplary embodiment, lifting bolt 152 is further rotated relative to inner lifting bushing 154, such that the threaded connection therebetween lifts inner lifting bushing 154, outer lifting bushing 156, and, via the interference fit between outer lifting bushing 156 and interior wall 64, upper section 46 relative to lower section 48, such that gap 70 is created between upper section 46 and lower section 48.

In alternative embodiments, tool 150 is engageable in any suitable opening and operable for any suitable additional or alternative purpose, rather than solely for separating upper casing 46 and lower casing 48.

Figure 9:
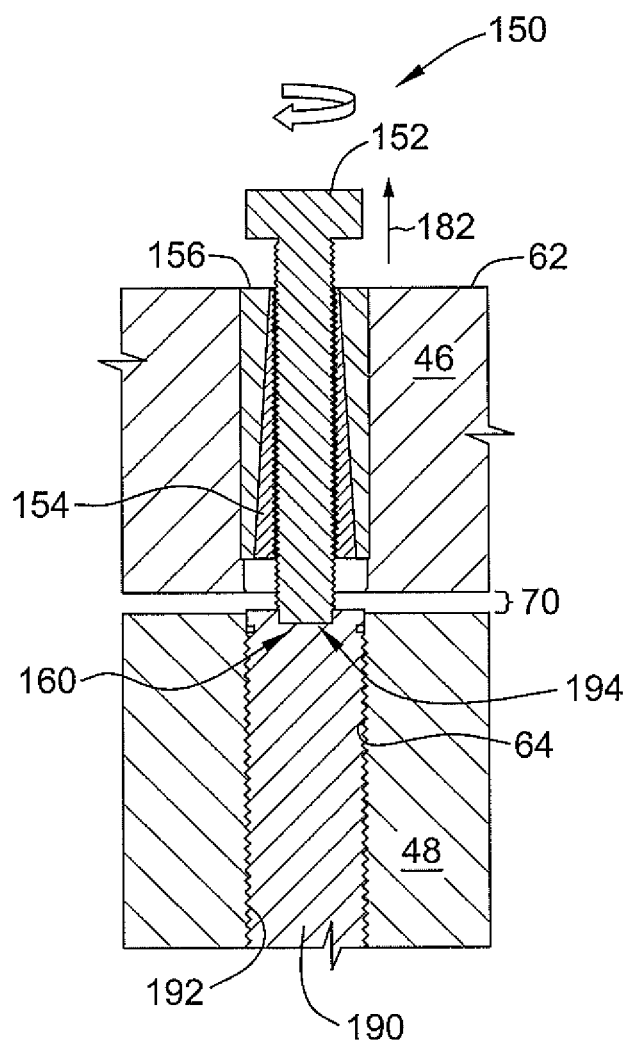
FIG. 9 is a schematic cross-sectional view of another exemplary tool coupled to another exemplary casing that may be used with the exemplary rotary machine shown in FIG. 1.

FIG. 9 is a schematic cross-sectional view of another exemplary embodiment of tool 150 coupled to another exemplary embodiment of casing 36. The embodiments of tool 150 and casing 36 illustrated in FIG. 9 are similar to the embodiment of tool 150 shown in FIGS. 3-5 and the embodiment of casing 36 shown in FIGS. 2-5, respectively, except as otherwise described herein. In this alternative embodiment, interior wall 64 of fastener opening 60 within lower casing 48 is threaded to facilitate coupling of upper casing 46 and lower casing 48 using a threaded bolt (not shown). To facilitate use of tool 150 while reducing a potential for lifting member 152 to damage the threads on interior wall 64, a support 190 having an outer surface 192 threaded complementarily to the threads on interior wall 64 is used. For example, prior to coupling tool 150 to casing 36, support 190 is inserted into fastener opening 60 through surface 62 and rotated to threadably engage outer surface 192 and threaded interior wall 64 within lower casing 48.

In the exemplary embodiment, a first end 194 of support 190 is configured to receive first end 160 of lifting member 152. Tool 150 is operable to facilitate separation of upper casing 46 and lower casing 48 as described above with reference to FIGS. 3-5, but first end 160 engages support 190, rather than end wall 66 of fastener opening 60, such that when lifting bolt 152 is further rotated relative to inner lifting bushing 154, the threaded connection therebetween lifts inner lifting bushing 154, outer lifting bushing 156, and, via the interference fit between outer lifting bushing 156 and interior wall 64, upper section 46 relative to lower section 48, to create gap 70 between upper section 46 and lower section 48.

Figure 6:
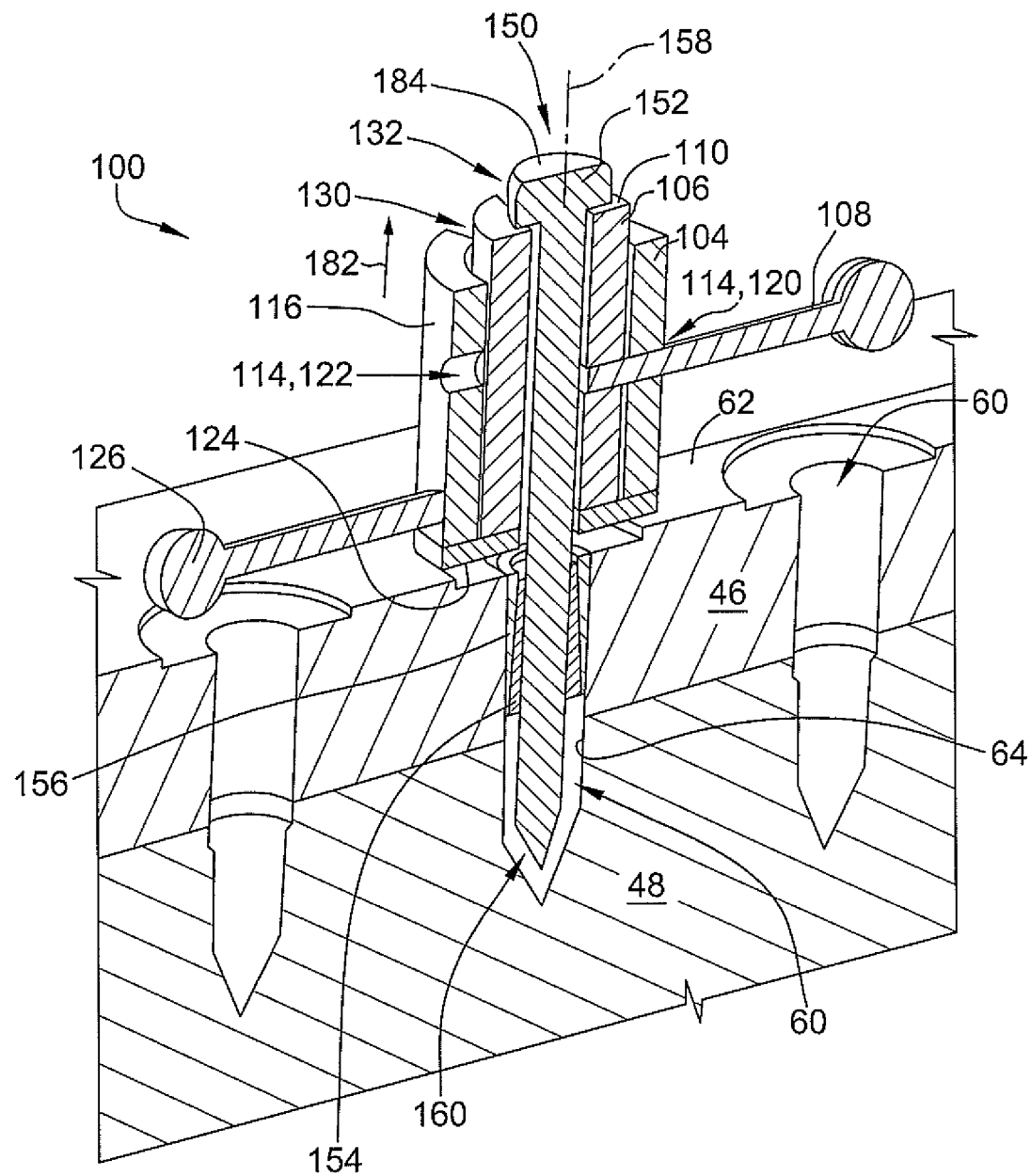
FIG. 6 is a schematic sectional view of an exemplary locking device coupled to the tool shown in FIG. 3.
Figure 7:
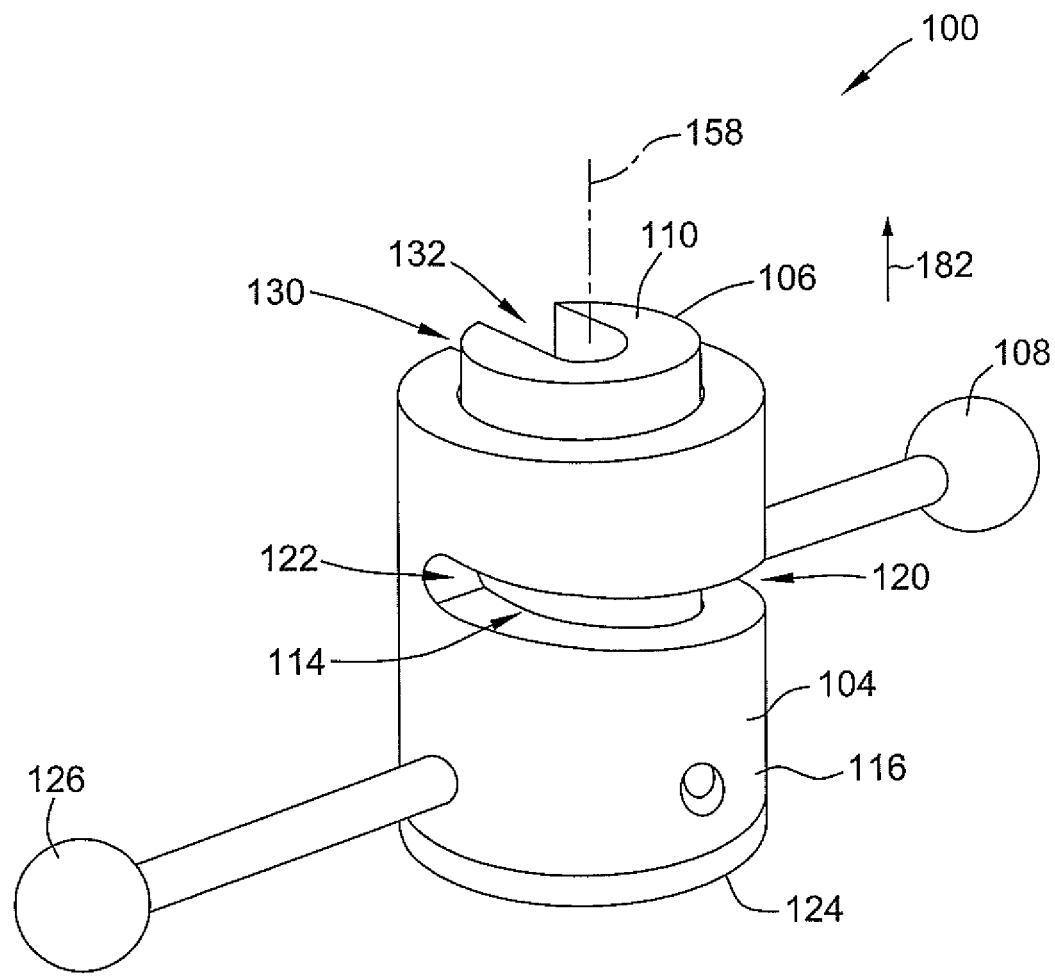
FIG. 7 is a schematic perspective view of the locking device shown in FIG. 6.
Figure 8:
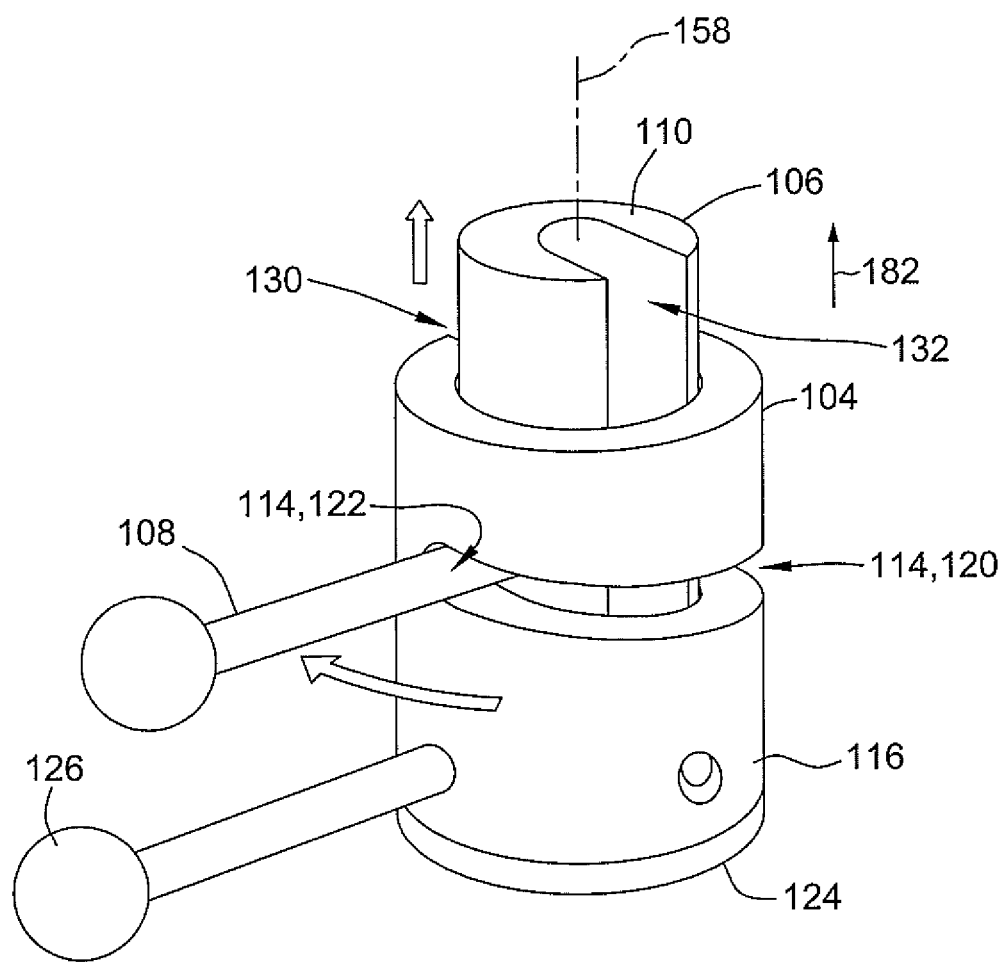
FIG. 8 is another schematic perspective view of the locking device shown in FIG. 6.

FIG. 6 is a schematic sectional perspective view, taken along lines 3-3 shown in FIG. 2, of an exemplary locking device 100 coupled to tool 150. FIG. 7 is a schematic perspective view of locking device 100 in a first operational state, and FIG. 8 is a schematic perspective view of locking device 100 in a second operational state. Locking device 100 facilitates locking tool 150 into fastener opening 60. More specifically, locking device 100 facilitates moving lifting member 152 in extraction direction 182, as described above.

With reference to FIGS. 6-8, locking device 100 includes a lift 106 coupled to a base 104 for movement relative to base 104. More specifically, lift 106 is moveable relative to base 104 between a first position, shown in FIGS. 6 and 7, and a second position, shown in FIG. 8. Moreover, lift 106 includes an interface portion 110 that moves in extraction direction 182 relative to base 104 when lift 106 is moved from the first position to the second position. Interface portion 110 is coupleable to lifting member 152, such that lifting member 152 moves with interface portion 110 in extraction direction 182 relative to base 104 when lift 106 is moved from the first position to the second position.

In the exemplary embodiment, base 104 has a generally annular shape. In alternative embodiments, base 104 has any suitable shape that enables locking device 100 to function as described herein. In the exemplary embodiment, lift 106 is coupled within base 104 for both rotational movement about longitudinal axis 158 and translation along longitudinal axis 158. More specifically, lift 106 is sized to be positioned within annular base 104 in a clearance fit and movement of lift 106 from the first position to the second position relative to base 104 includes both rotational and translational movement. In alternative embodiments, lift 106 has any suitable shape, and moves between the first and second positions in any suitable fashion, that enables locking device 100 to function as described herein.

Also in the exemplary embodiment, a lever 108 is fixedly coupled to lift 106. Lever 108 extends through a slot 114 defined in a sidewall 116 of base 104 and extending therethrough. Slot 114 extends from a first end 120 to a second end 122. Lever 108 is positioned proximate first end 120 when lift 106 is in the first position shown in FIGS. 6 and 7, and lever 108 is moveable into a position proximate second end 122 to position lift 106 in the second position shown in FIG. 8. More specifically, slot 114 is shaped to cooperate with lever 108 such that, as lever 108 is rotated from first end 120 to second end 122 of slot 114, slot 114 urges lever 108, and thus lift 106 coupled to lever 108, in an extraction direction 182. For example, in certain embodiments, slot 114 defines a generally helical shape. More specifically, in the exemplary embodiment, slot 114 defines a half-turn helical shape between first end 120 and second end 122. In certain embodiments, lever 108 and cooperating slot 114 configured to operate on a half-turn enable locking device 100 to be operated without interference in cramped environments, such as, but not limited to, environments in which fastener opening 60 is parallel to and adjacent a wall. In alternative embodiments, slot 114 defines any suitable shape that enables locking device 100 to function as described herein.

In certain embodiments, lever 108 constrained to move within slot 114 enables rapid and/or forceful movement of locking device 100 from the first position to the second position, thereby enabling rapid movement of lifting member 152 in extraction direction 182 to facilitate increased engagement of tapered surfaces 168 and 178 and, thus, increased transverse expansion of outer lifting bushing 156, as described above with respect to FIG. 4. Alternatively, lever 108 and/or slot 114 enables movement of locking device 100 from the first position to the second position at any suitable speed that enables locking device 100 to function as described herein.

Additionally or alternatively, base 104 and lift 106 cooperate in any other suitable fashion that facilitates moving interface portion 110 of lift 106 from the first position to the second position relative to base 104 in extraction direction 182. For example, in certain embodiments, a spring (not shown) is coupled between an end wall 124 of base 104 and lift 106 to facilitate moving interface portion 110 of lift 106 from the first position to the second position in extraction direction 182.

In certain embodiments, locking device 100 is manually operable, for example by hand operation of lever 108, facilitating an ease and speed of set-up and use of locking device 100 without a need for connection to pneumatic, hydraulic, electrical, or other supporting infrastructure. In alternative embodiments, locking device 100 is operable using any suitable motive force.

Base 104 is positionable with respect to lifting member 152 such that interface portion 110 is coupleable to lifting member 152. For example, in the exemplary embodiment, an first aperture 130 is defined longitudinally in sidewall 116 of base 104 and sized to receive lifting member 152 therethrough. Similarly, an second aperture 132 is defined longitudinally in lift 106 and sized to receive lifting member 152 therethrough, and further sized to enable positioning of lifting member 152 centrally within lift 106. Moreover, second aperture 132 is positioned to align with first aperture 130 when lift 106 is in the first position. Thus, base 104 is slidably positionable with respect to lifting member 152 such that lifting member 152 extends generally concentrically within base 104 and lift 106 when lift 106 is in the first position. After lifting member 152 is positioned generally concentrically within base 104 and lift 106, lift 106 is rotatable about lifting member 152 to the second position, as described above. In alternative embodiments, locking device 100 has any other suitable configuration that enables positioning of base 104 with respect to lifting member 152 such that interface portion 110 is coupleable to lifting member 152.

In the exemplary embodiment, locking device 100 also includes a handle 126 fixedly coupled to base 104. Handle 126 facilitates positioning locking device 100 with respect to lifting member 152, and maintaining locking device 100 in position as locking device 100 is operated. For example, an operator grasps handle 126 with one hand and holds locking device 100 in position as the other hand rotates lever 108 from first end 120 to second end 122 of slot 114. In alternative embodiments, locking device 100 does not include handle 126.

In the exemplary embodiment, an end surface of lift 106 defines interface portion 110. For example, lifting member 152 is a bolt that includes a bolt head 184, and interface portion 110 is positioned to couple against bolt head 184 when locking device 100 is positioned with respect to lifting member 152. In some embodiments, the end surface of lift 106 is normal to longitudinal axis 158. Alternatively, the end surface of lift 106 is other than normal to longitudinal axis 158. In operation, when lift 106 is moved from the first position to the second position such that interface portion 110 moves in extraction direction 182 relative to base 104, interface portion 110 bears against bolt head 184 and urges lifting member 152 in extraction direction 182 relative to base 104, such that outer lifting bushing 156 is secured against interior wall 64 that defines fastener opening 60, as described above with respect to FIG. 4. In alternative embodiments, lifting member 152 is any suitable structure, and lift 106 defines interface portion 110 in any suitable fashion that enables interface portion 110 to move lifting member 152 in extraction direction 182 relative to base 104 when lift 106 is moved from the first position to the second position.

In the exemplary embodiment, end wall 124 of base 104 is coupled against surface 62, in which fastener opening 60 is defined, during operation of locking device 100. Moreover, end wall 124 extends at least partially above fastener opening 60 adjacent lifting member 152, such that end wall 124 provides a barrier against outer lifting bushing 156 moving out of fastener opening 60 in extraction direction 182 when interface portion 110 moves lifting member 152 in extraction direction 182. In alternative embodiments, end wall 124 does not extends at least partially above fastener opening 60. For example, but not by way of limitation, locking device 100 contains suitable alternative structure to inhibit outer lifting bushing 156 moving out of fastener opening 60 in extraction direction 182.

Figure 10:
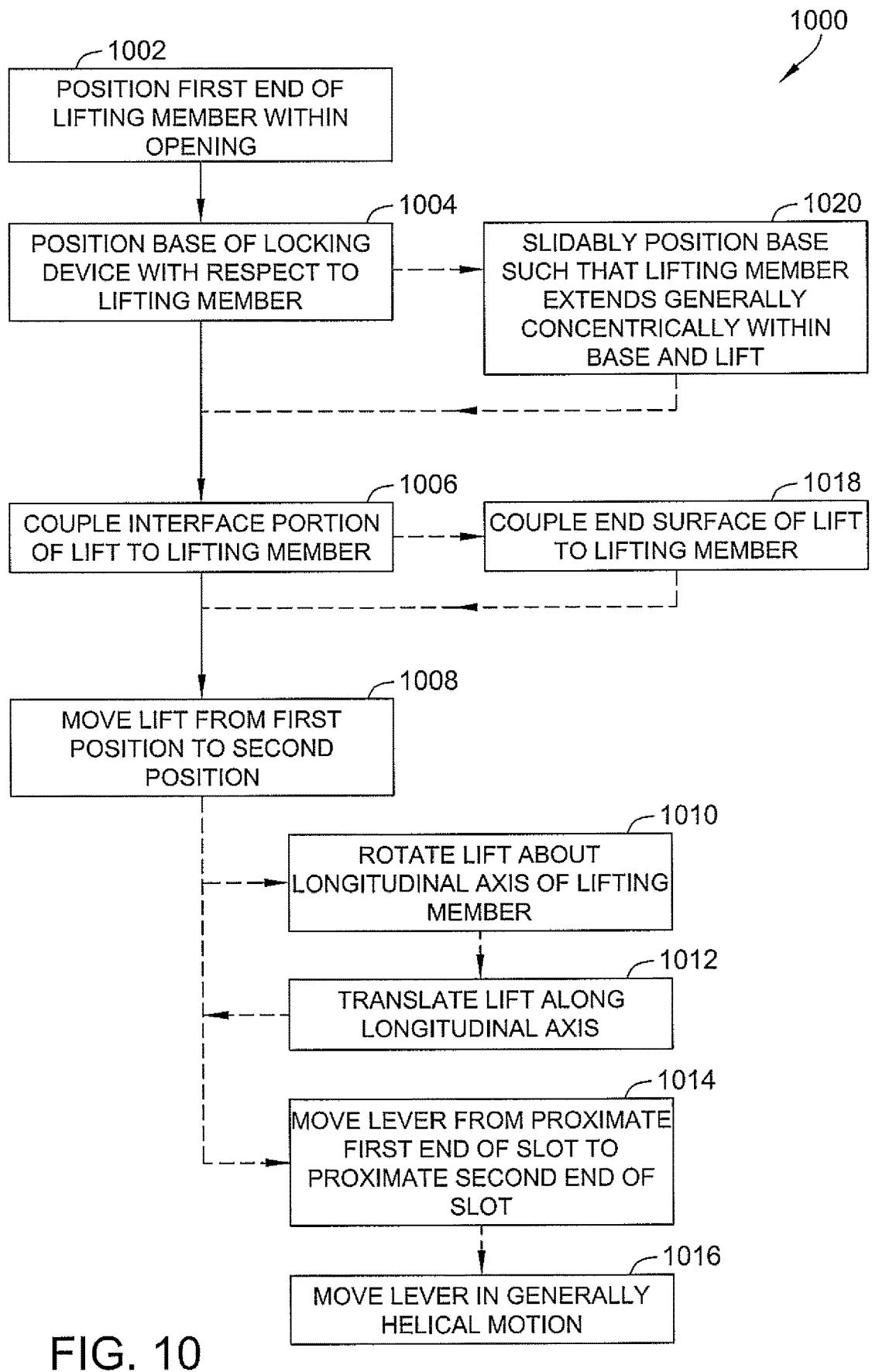
FIG. 10 is a flow diagram of an exemplary method of locking a tool, such as the tool shown in FIG. 3 or FIG. 9, in an opening.

FIG. 10 is a flow diagram of an exemplary method 1000 of locking a tool, such as tool 150, in an opening, such as opening 60. With reference also to FIGS. 1-9, in the exemplary embodiment, method 1000 includes positioning 1002 a first end of a lifting member of the tool, such as first end 160 of lifting member 152, within the opening. Method 1000 also includes positioning 1004 a base of a locking device, such as base 104 of locking device 100, with respect to the lifting member. A lift, such as lift 106, is coupled to the base for movement relative to the base. Method 1000 further includes coupling 1006 an interface portion of the lift, such as interface portion 110, to the lifting member, and moving 1008 the lift from a first position to a second position relative to the base, such that the interface portion moves the lifting member in an extraction direction of the opening, such as extraction direction 182.

In certain embodiments, the step of moving 1008 the lift from the first position to the second position includes rotating 1010 the lift about a longitudinal axis of the lifting member, such as longitudinal axis 158, and translating 1012 the lift along the longitudinal axis.

In some embodiments, the base has a generally annular shape; a slot, such as slot 114, is defined in a sidewall of the base, such as sidewall 116, and extends therethrough; the lift is positioned in a clearance fit within the base such that a lever, such as lever 108, coupled to the lift extends through the slot; and the step of moving 1008 the lift from the first position to the second position includes moving 1014 the lever from proximate a first end of the slot to proximate a second end of the slot. In some such embodiments, the step of moving 1014 the lever includes moving 1016 the lever in a generally helical motion between the first end and the second end.

In certain embodiments, the step of coupling 1006 the interface portion of the lift to the lifting member includes coupling 1018 an end surface of the lift to the lifting member.

In some embodiments, the step of positioning 1004 the base includes slidably positioning 1020 the base with respect to the lifting member such that the lifting member extends generally concentrically within the base and the lift.

The above-described locking device provides a simple and cost-effective method for securely engaging a tool within an opening. Specifically, the locking device includes a lift coupled to a base for movement relative to the base. An interface portion of the lift couples to a lifting member of the tool to move the lifting member in an extraction direction of the opening when the lift is moved from a first position to a second position relative to the base. For example, in certain embodiments, the lift is coupled to a handle that enables rapid application of an impulse to the lifting member, and the lifting member forces a first tapered bushing of the tool into a complementarily tapered second bushing of the tool, such that the second bushing expands into a tight interference fit within the opening.

An exemplary technical effect of the methods, systems, and apparatus described herein includes at least one of: (a) enabling application of a locking force to secure a tool within an opening located in a confined space; (b) enabling application of a locking force to secure a tool within an opening without a need for connection to pneumatic, hydraulic, electrical, or other supporting infrastructure; and (c) enabling application of a locking force to secure a tool within an opening using a device that is mechanically simple to manufacture and maintain and easy to install and operate, reducing a time and cost required for securing a tool within, for example, a series of such openings.

Exemplary embodiments of locking devices are described above in detail. The locking devices, and methods and systems using such a device, are not limited to the specific embodiments described herein, but rather, components of systems and/or steps of the methods may be utilized independently and separately from other components and/or steps described herein. For example, the exemplary embodiments can be implemented and utilized in connection with many other applications that require a tool to be securely engaged within an opening.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A locking device operable to lock a tool in an opening, said locking device comprising:
    a base positionable with respect to a lifting member of the tool when a first end of the lifting member is positioned within the opening; and
    a lift coupled to said base for movement relative to said base, said lift comprising an interface portion coupleable to the lifting member such that the lifting member is moveable with said interface portion in an extraction direction of the opening when said lift is moved from a first position to a second position relative to said base, wherein the extraction direction extends away from the opening, said base circumscribes said lift.

2. The locking device of claim 1, wherein said lift is coupled to said base for rotation about a longitudinal axis of the lifting member and translation along the longitudinal axis.

3. The locking device of claim 1, wherein said base has a generally annular shape, and said lift is positioned in a clearance fit within said base.

4. The locking device of claim 3, further comprising:
    a slot defined in a sidewall of said base and extending therethrough, said slot extends from a first end to a second end; and
    a lever coupled to said lift, said lever extends through said slot, said lever is moveable from proximate said first end of said slot to proximate said second end of said slot such that said lift moves from the first position to the second position.

5. The locking device of claim 4, wherein said slot defines a generally helical shape between said first end and said second end.

6. The locking device of claim 1, wherein said interface portion is defined by an end surface of said lift, said end surface is normal to a longitudinal axis of the lifting member when said base is positioned with respect to the lifting member.

7. The locking device of claim 1, wherein said base is slidably positionable with respect to the lifting member such that the lifting member extends generally concentrically within said base and said lift when said lift is in the first position.

8. A system for separating an upper section of a turbine casing from a lower section of the turbine casing, the upper and lower sections cooperate to define a fastener opening extending therebetween, said system comprising:
- a lifting member comprising a first end positionable within the fastener opening;
- a base positioned with respect to said lifting member when said first end is positioned within the fastener opening, said base positioned on the upper section of the turbine casing; and
- a lift coupled to said base for movement relative to said base, said lift comprising an interface portion coupled to said lifting member such that said lifting member is moveable with said interface portion in an extraction direction of the opening when said lift is moved from a first position to a second position relative to said base, said base circumscribes said lift, and wherein the extraction direction extends away from the fastener opening.

9. The system of claim 8, wherein said lift is coupled to said base for rotation about a longitudinal axis of said lifting member and translation along said longitudinal axis.

10. The system of claim 8, wherein said base has a generally annular shape, and said lift is positioned in a clearance fit within said base.

11. The system of claim 10, further comprising:
- a slot defined in a sidewall of said base and extending therethrough, said slot extends from a first end to a second end; and
- a lever coupled to said lift, said lever extends through said slot, said lever is moveable from proximate said first end of said slot to proximate said second end of said slot such that said lift moves from the first position to the second position.

12. The system of claim 11, wherein said slot defines a generally helical shape between said first end and said second end.

13. The system of claim 8, wherein said interface portion is defined by an end surface of said lift, said end surface is normal to a longitudinal axis of said lifting member when said base is positioned with respect to said lifting member.

14. The system of claim 8, wherein said base is positioned with respect to said lifting member such that said lifting member extends generally concentrically within said base and said lift when said lift is in the first position.

15. A method of locking a tool in an opening, said method comprising:
- positioning a first end of a lifting member of the tool within the opening;
- positioning a base of a locking device with respect to the lifting member, wherein a lift is coupled to the base for movement relative to the base, wherein the base circumscribes the lift;
- coupling an interface portion of the lift to the lifting member; and
- moving the lift from a first position to a second position relative to the base, such the interface portion moves the lifting member in an extraction direction of the opening, wherein the extraction direction extends away from the opening.

16. The method of claim 15, wherein said moving the lift from the first position to the second position comprises rotating the lift about a longitudinal axis of the lifting member and translating the lift along the longitudinal axis.

17. The method of claim 15, wherein the base has a generally annular shape and a slot is defined in a sidewall of the base and extends therethrough, and wherein the lift is positioned in a clearance fit within the base such that a lever coupled to the lift extends through the slot, said moving the lift from the first position to the second position comprises moving the lever from proximate a first end of the slot to proximate a second end of the slot.

18. The method of claim 17, wherein said moving the lever comprises moving the lever in a generally helical motion between the first end and the second end.

19. The method of claim 15, wherein said coupling the interface portion of the lift to the lifting member comprises coupling an end surface of the lift to the lifting member.

20. The method of claim 15, wherein said positioning the base comprises slidably positioning the base with respect to the lifting member such the lifting member extends generally concentrically within the base and the lift.

* * * * *